Jan. 16, 1940. R. E. HENDRICKSON 2,187,028
WELL SURVEY INSTRUMENT CASE
Filed Oct. 24, 1938
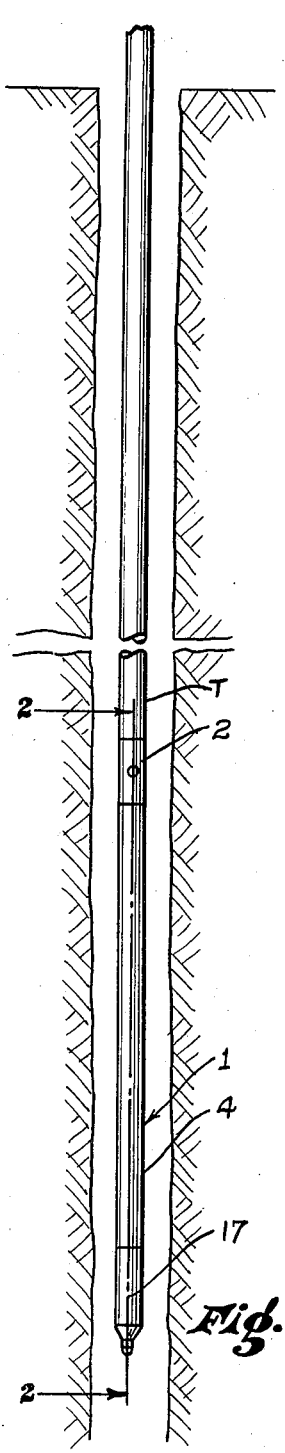
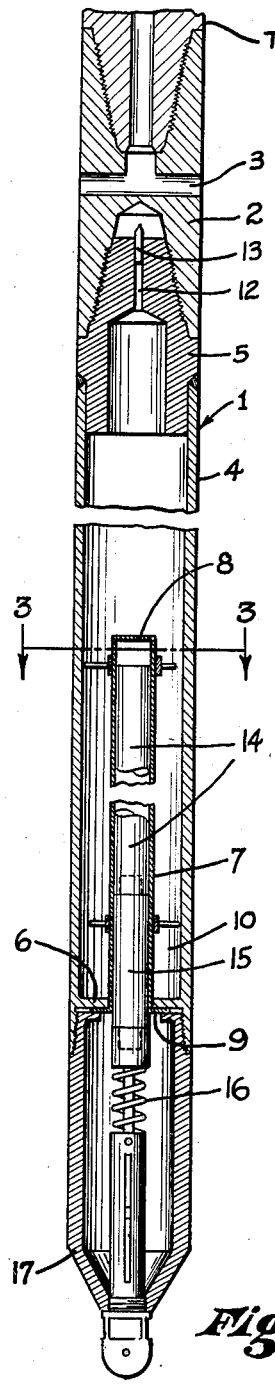
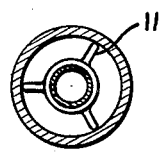
Fig.3
Fig.1  Fig.2
INVENTOR
RALPH E. HENDRICKSON
BY
ATTORNEY Patented Jan. 16, 1940

2,187,028

UNITED STATES PATENT OFFICE 2,187,028

WELL SURVEY INSTRUMENT CASE

Ralph E. Hendrickson, Los Angeles, Calif., assignor to Lane-Wells Company, Los Angeles, Calif., a corporation of Delaware Application October 24, 1938, Serial No. 236,683

4 Claims. (Cl. 33—205.5)

My invention relates to well survey instrument cases, and among the objects of my invention are:

First, to provide a device of this character which is particularly designed to facilitate the surveying of deep wells, or wells in which the temperature is excessive;

Second, to provide a case adapted to receive a photographic well survey instrument and maintain the temperature thereof within safe limits during the course of a well survey operation;

Third, to provide a well survey instrument case having a vacuum chamber around the survey instrument to minimize the transfer of heat to the instrument;

Fourth, to provide a well survey instrument case wherein the well survey instrument may be readily inserted and removed with no more difficulty than that involved with conventional cases of this character and their instruments; and Fifth, to provide a case of this character which is simple of construction in proportion to its functions, durable, and capable of withstanding the extremely rough use that an instrument case of this character encounters.

With the above and other objects in view, reference is made to the accompanying drawing, in which:

Figure 1 is an elevational view of my instrument case shown in position in a well;

Figure 2 is a fragmentary longitudinal sectional view thereof, taken through 2—2 of Figure 1; and Figure 3 is a typical transverse sectional view thereof, taken through 3—3 of Figure 2.

My instrument, designated generally by 1, is attached to a tubing string T through a sub 2. The sub or collar 2 has a transverse circulation bore 3 communicating with the interior of the tubing. Its lower end is provided with a threaded socket to receive the upper correspondingly threaded end of the instrument case.

The instrument per se comprises an outer shell 4 which is welded to an end piece 5, above referred to as being threaded and joining the sub 2. The lower end of the outer case 4 is internally threaded and above the termination of the threads is provided with an inturned flange 6. An inner shell 7 extends into the outer shell 4. The inner shell is closed at its upper end 8 and is flanged at its lower end as indicated by 9, then soldered, brazed or welded to the internal flange 6 so that there is formed between the inner and outer shells 4 and 7 a chamber 10. Spacing spiders 11 are provided around the inner shell 7 at different points so as to maintain it in a centered relation with respect to the outer shell. The spiders are formed of insulating material and have as small dimensions as possible.

The upper end of the instrument case, that is, the end piece 5, is provided with a small bore 12 therethrough in which is sealed a tube 13 which is initially connected to a vacuum pump for the purpose of establishing a vacuum in the chamber 10. After this is accomplished the tube 13 is sealed off.

The inner shell 7, being open at its lower end, forms a compartment for the reception of a survey instrument 14. This instrument may be of any conventional type, for example, a multiple-shot photographic survey instrument indicating inclination only, or if the parts of the instrument case are of non-magnetic material the instrument 14 may include a compass. The lower end of the instrument 14 terminates a substantial distance within the shell 7 and is connected through a tubular spacer 15 of insulating material to a yieldable mounting structure 16.

The lower end of the outer shell 4 receives a nose sub 17 which is hollow and open at its lower end to receive the lower end of the spring mounting 16 so that the instrument 14, spacer 15 and spring mounting 16 may be inserted through the nose sub into position and seal the sub 17.

The outer shell 14, end piece 5, sealing connection between the nose sub 17 and the case 4, as well as the lower end of the mounting structure 16, are all designed to withstand tremendous hydrostatic pressure, for an instrument of this character is intended for operation in depths as great as 15,000 feet, often with the well bore filled with heavy drilling mud, so that the pressure may exceed 7000 pounds per square inch. The particular application of the instrument case is to house a photographic type survey instrument which is lowered in stages on drill pipe and the rotation of the drill pipe noted so that the azimuth of the instrument is known at all times. A survey to the depth of 15,000 feet involves approximately ten hours operation, and heretofore it has been impossible to obtain survey records by photographic means for the reason that the temperatures existing at the lower end of a well of such depth destroys the film, but with the above described survey instrument case the temperature within the inner shell 7 is maintained below a point destructive to the film.

Though I have shown and described a particular embodiment of my invention, I do not wish to be limited thereto, but desire to include in the scope of my invention the constructions, combinations and arrangements as set forth in the appended claims.

I claim:

1. In the art of surveying wells wherein destructive temperatures are encountered: an instrument case adapted to be connected to the lower end of a tubing string, said instrument case comprising outer and inner shells defining an evacuated chamber and means of access to the interior of the inner shell for the insertion of a survey instrument; a yieldable suspension for such instrument positioned outside of said case and an insulating link interposed between the instrument and suspension means to minimize heat transfer to the instrument.

2. In the art of surveying wells wherein detructive temperatures are encountered: an outer shell; an end piece for attachment to tubing string; a nose piece capping the opposite end of said outer shell; an inner shell fitted within the outer shell and connected by one end therein to define an annular vacuum chamber, said inner shell being open at one end to define an instrument compartment adapted to receive a surveying instrument; yieldable means mounted within said nose piece for yieldably supporting an instrument within said case; and an insulation link between said yieldable means and said instrument extending into the open end of said compartment.

3. In the art of surveying wells wherein destructive temperatures are encountered: an instrument case adapted to be connected to the lower end of a tubing string, said instrument case comprising outer and inner shells defining an evacuated chamber and means of access to the interior of the inner shell for the insertion of a survey instrument; a housing continuing from said outer shell and having an opening at its lower end; a survey instrument; and a yieldable supporting means for said instrument, including a sealing cap adapted to be secured in the opening of said housing to seal the same when said supporting means is within said housing and said survey instrument is inserted in said inner shell, said housing forming a dead air space around said supporting means to minimize transfer of heat to said instrument.

4. In the art of surveying wells wherein destructive temperatures are encountered: an instrument case adapted to be connected to the lower end of a tubing string, said instrument case comprising outer and inner shells defining an evacuated chamber and means of access to the interior of the inner shell for the insertion of a survey instrument; a housing continuing from said outer shell and having an opening at its lower end; a survey instrument; a yieldable supporting means for said instrument, including a sealing cap adapted to be secured in the opening of said housing to seal the same when said supporting means is within said housing and said survey instrument is inserted in said inner shell, said housing forming a dead air space around said supporting means to minimize transfer of heat to said instrument; and an insulating link interposed between said instrument and supporting means to minimize heat transfer from said supporting means to said instrument.

RALPH E. HENDRICKSON.